(No Model.)
R. B. FOUZER.
WHEELBARROW.
No. 392,150. Patented Oct. 30, 1888.
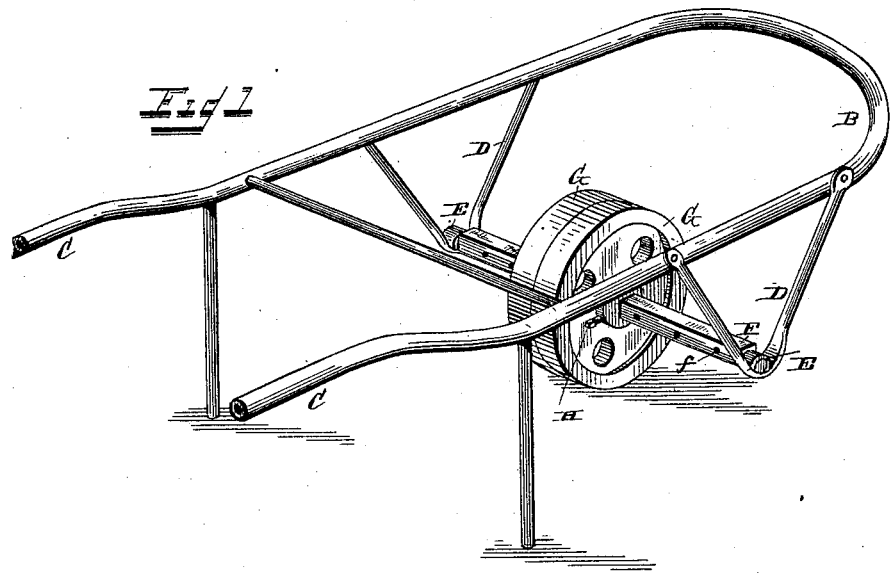
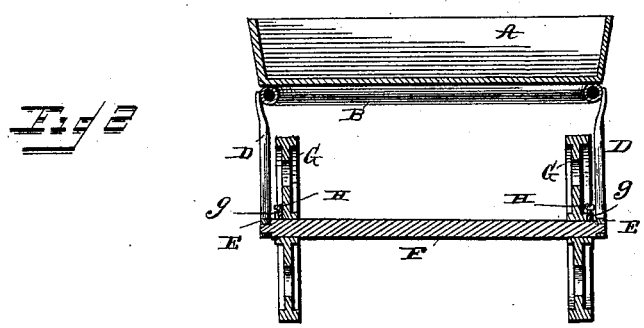
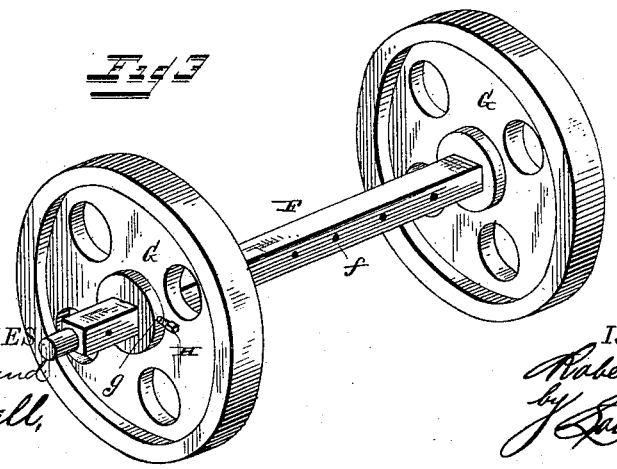
WITNESSES
F. L. Durand
A. L. Morsell
INVENTOR.
Robert B. Fouzer,
by Louis Bagger & Co,
Attorneys.

UNITED STATES PATENT OFFICE.

ROBERT B. FOUZER, OF BUTLER, PENNSYLVANIA.

WHEELBARROW.

SPECIFICATION forming part of Letters Patent No. 392,150, dated October 30, 1888.

Application filed June 7, 1888. Serial No. 276,366. (No model.)

*To all whom it may concern:*

Be it known that I, ROBERT B. FOUZER, a citizen of the United States, and a resident of Butler, in the county of Butler and State of Pennsylvania, have invented certain new and useful Improvements in Wheelbarrows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved wheelbarrow, showing the two wheels in contact with each other. Fig. 2 is a cross-sectional view with the wheels spread apart; and Fig. 3 is a detail view, in perspective, of the shaft and the wheels mounted thereon, showing more clearly the means of adjusting the wheels in any position upon the shaft or axle.

Like letters of reference denote corresponding parts in all the figures.

My invention has relation to improvements in wheelbarrows; and it has for its object to produce a device of this character provided with an axle having mounted thereon adjustable wheels adapted to be placed in contact with each other or spread apart, as desired, and, furthermore, in providing a construction so as to adapt the device to be readily and conveniently tilted forward without in the least injuring the body of the wheelbarrow.

With these ends in view it consists in the combination, with a shaft or axle of a wheelbarrow, of wheels adapted to be adjusted upon said axle or shaft at different widths; and, furthermore, in the combination, with a body or receptacle of a wheelbarrow, of a bed-frame consisting of one piece, having curved front portion and diverging ends, forming handles, the said curved portion extending forward of the wheel or wheels of the device; and, furthermore, the invention consists in various details of construction wherein the objects are attained.

Referring to the drawings, the letter A designates the body of the barrow, and B the bed-frame, consisting of one piece bent or curved at its center, and having its ends diverging, so as to form handles C C. This frame is preferably constructed of gas-pipe or other tubing, whereby the same is rendered extremely light and strong.

Secured to the sides of the bed-frame are V-shaped hangers D D, provided with bails E E, through which pass the reduced rounded ends of a shaft or axle, F. The enlarged portion of the shaft or axle is preferably of rectangular shape, and is provided with a series of recesses or depressions, *f*.

Mounted upon the shaft F are two wheels, G G, the outer portion of the hubs thereof being provided with perforations *g g*, through which pass set-screws H H. It will be seen that by this arrangement and construction of the shaft and wheels the latter may be adjusted at any width upon said shaft or axle by simply operating the set-screws. The wheels G G can, if desired, be brought to bear against each other, or may be separated at any width desired. When occasion requires that the load may be readily dumped from either side of the barrow, it is obvious that the wheels should be placed together in the center of the axle, and on the other hand, when this is not desirable, the wheels may be spread apart, thereby balancing the load and overcoming the tendency which the weight may have to tilt the barrow to one side. It will also be seen that the hangers are suspended from near the center of the sides of the bed-frame, so as to bring the wheels as near as possible beneath the center of the load, thereby causing the weight to be exerted almost entirely upon said wheels, thereby relieving the handles to a great extent and enabling a greater load to be conveyed with less labor than is ordinarily requisite.

The curved portion of the bed-frame projects forward of the body of the barrow, so that the device may be upset easily by raising the handles and tilting forward, the curved portion of course striking the ground and obviating all danger of injury or damage to the body of the wheelbarrow.

From the foregoing description, taken in connection with the accompanying drawings, the operation, construction, and advantages of my improved wheelbarrow will be readily understood. It will be seen that the axle used by me, with the wheels mounted thereon, may be employed in connection with any construction of barrow, and its adjustment effected with but very little trouble and in a moment of time without necessitating the altering or changing of the construction of the device to which it is attached.

Having thus described my invention, I claim and desire to secure by Letters Patent of the United States—

The combination, in a wheelbarrow, of a frame, a body upon the frame, V-shaped hangers secured near the middle of the frame, bails secured to the hangers, an axle journaled in the bails, and wheels upon the axle, substantially as set forth.

In testimony that I claim the foregoing as my own I have hereunto affixed my signature in presence of two witnesses.

ROBERT B. FOUZER.

Witnesses:
   ANDREW G. WILLIAMS,
   ALEX. MITCHELL.